United States Patent
Choi et al.

(10) Patent No.: US 9,867,034 B2
(45) Date of Patent: Jan. 9, 2018

(54) BASEBAND UNIT AND METHOD OF OBTAINING INFORMATION ON A REMOTE RADIO UNIT AND ANOTHER BASEBAND UNIT CONNECTED TO THE REMOTE RADIO UNIT SUPPORTING THE OPERATION OF THE REMOTE RADIO UNIT

(71) Applicant: LG ELECTRONICS INC., Seoul (KR)

(72) Inventors: Hyeyoung Choi, Seoul (KR); Heejeong Cho, Seoul (KR); Jaehoon Chung, Seoul (KR); Genebeck Hahn, Seoul (KR); Eunjong Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/912,039

(22) PCT Filed: Sep. 2, 2014

(86) PCT No.: PCT/KR2014/008186
§ 371 (c)(1),
(2) Date: Feb. 12, 2016

(87) PCT Pub. No.: WO2015/037857
PCT Pub. Date: Mar. 19, 2015

(65) Prior Publication Data
US 2016/0192181 A1   Jun. 30, 2016

Related U.S. Application Data

(60) Provisional application No. 61/876,217, filed on Sep. 10, 2013.

(51) Int. Cl.
H04W 4/00      (2009.01)
H04W 8/22      (2009.01)
(Continued)

(52) U.S. Cl.
CPC ............... *H04W 8/22* (2013.01); *H04B 7/26* (2013.01); *H04B 17/00* (2013.01); *H04L 25/00* (2013.01);
(Continued)

(58) Field of Classification Search
None
See application file for complete search history.

(56) References Cited

U.S. PATENT DOCUMENTS

2008/0167003 A1 *   7/2008   Wang ..................... H04W 8/20
                                                   455/411
2010/0197298 A1      8/2010   So et al.
(Continued)

FOREIGN PATENT DOCUMENTS

KR    10-2011-0112757 A    10/2011
KR    10-2013-0064471 A    6/2013

*Primary Examiner* — Idowu O Osifade
(74) *Attorney, Agent, or Firm* — Dentons US LLP

(57) ABSTRACT

Disclosed are a BBU and a method of obtaining RRU information, which comprises, in a heterogeneous cell environment in which a macro cell and small cell coexist, a BBU receiving, from a terminal and via a serving RRU of the terminal connected to the BBU, a measurement reporting message that includes information on an RRU transmitting, to the terminal, a reference signal at an intensity equal to or stronger than a threshold value, and determining the RRU as a neighboring RRU of the serving RRU by using information included in the measurement reporting message.

20 Claims, 12 Drawing Sheets

(51) Int. Cl.
- *H04B 7/26* (2006.01)
- *H04B 17/00* (2015.01)
- *H04L 25/00* (2006.01)
- *H04L 12/26* (2006.01)
- *H04W 16/32* (2009.01)
- *H04W 24/02* (2009.01)
- *H04W 24/10* (2009.01)
- *H04W 88/08* (2009.01)
- *H04W 24/08* (2009.01)
- *H04L 12/24* (2006.01)

(52) U.S. Cl.
CPC ............. *H04L 43/16* (2013.01); *H04W 16/32* (2013.01); *H04W 24/02* (2013.01); *H04L 41/12* (2013.01); *H04W 24/08* (2013.01); *H04W 24/10* (2013.01); *H04W 88/085* (2013.01)

(56) References Cited

U.S. PATENT DOCUMENTS

| | | |
|---|---|---|
| 2011/0287791 A1 | 11/2011 | Fujishima et al. |
| 2012/0063361 A1 | 3/2012 | Zhao |
| 2012/0190374 A1 | 7/2012 | Jo et al. |
| 2012/0224541 A1 | 9/2012 | Yoshiuchi et al. |
| 2012/0281556 A1 | 11/2012 | Sayana et al. |
| 2014/0036822 A1* | 2/2014 | Maeda .................. H04W 72/04 370/329 |
| 2014/0212129 A1* | 7/2014 | Huang .................. H04B 10/25 398/2 |
| 2014/0321282 A1* | 10/2014 | Pragada ............ H04W 36/0072 370/235 |
| 2014/0349659 A1* | 11/2014 | Ishii .................... H04W 8/082 455/444 |
| 2015/0181470 A1* | 6/2015 | Chai .................. H04W 36/0005 455/438 |

* cited by examiner

MeNB : macro eNode B
PeNB : pico eNodeB
FeNB : femto eNode B

MUE : macro UE
PUE : pico UE
FUE : femto UE

BASEBAND UNIT AND METHOD OF OBTAINING INFORMATION ON A REMOTE RADIO UNIT AND ANOTHER BASEBAND UNIT CONNECTED TO THE REMOTE RADIO UNIT SUPPORTING THE OPERATION OF THE REMOTE RADIO UNIT

This application is a National Stage Application of International Application No. PCT/KR2014/008186, filed on Sep. 2, 2014, which claims the benefit of U.S. Provisional Application No. 61/876,217, filed on Sep. 10, 2013, all of which are hereby incorporated by reference in their entirety for all purposes as if fully set forth herein.

TECHNICAL FIELD

The present invention relates to a method for a BBU to obtain information on an RRU in heterogeneous cell environment in which the RRU and the BBU are separated from each other and a technology related to the BBU.

BACKGROUND ART

A radio access network (RAN) configuration has been changed such that various types of small cells such as a pico cell, a femto cell, etc. interact with a macro cell. The RAN configuration refers to a heterogeneous cell configuration or a hierarchical cell configuration in which small cells for low power/near field communication coexist in addition to an existing macro cell-based homogeneous network. An object of a new RAN configuration is to increase QoE (Quality of Experience) by providing a high data transfer rate to an end user.

In small cell enhancements for E-UTRA and E-UTRAN study item (SI) as one of 3rd generation partnership project (3GPP) standard scopes, research has been ongoing into enhancement of indoor/outdoor scenarios using low power nodes, and the scenarios is described in 3GPP TR 36.932. In small cell enhancements for E-UTRA and E-UTRAN SI, research has been conducted to draw advantages of concept of dual connectivity to small cell layers and a macro cell layer in which a user uses the same or different carriers.

In consideration of the aforementioned trend, as various small cells are deployed, users are more closely located at a network in a physical manner. Hence, it is expected that communication is to be performed based on a user-centered virtual zone instead of legacy communication based on a cell of a base station in an enhanced 5G wireless access network. Moreover, in order to perform the communication via the user-centered virtual zone, it is necessary to deduct a service provision unit differentiated from a legacy cell-based service provision unit. In particular, it is necessary to deduct and solve technical issues capable of implementing such a service provision unit as a user-centered zone and it may cause a considerable change in a current wireless access network.

DISCLOSURE OF THE INVENTION

Technical Tasks

The present invention is devised to resolve general technical problems that are described above, and, accordingly, an object of the present invention is to make a BBU obtain information on a neighboring RRU of an RRU connected with the BBU.

Another object of the present invention is to make a BBU easily identify a BBU, which is to be coordinated to support a user equipment, by obtaining and managing information on BBUs connected with neighboring RRUs.

The other object of the present invention is to provide a method of newly updating and managing a previous connection relationship according to a change of a connection relationship between an RRU and a BBU.

The technical objects of the present invention will not be limited only to the objects described above. Accordingly, technical objects that have not been mentioned above or additional technical objects of the present application may be considered by those having ordinary skill in the art from the description presented below.

Technical Solution

In order to achieve the aforementioned technical tasks, the present invention proposes a series of processes necessary for a BBU to obtain information on a neighboring RRU of an RRU connected with the BBU and efficiently manage the information. Moreover, the present invention also proposes a method for the BBU to obtain information on BBUs connected with the neighboring RRU and manage the information.

Advantageous Effects

According to the exemplary embodiments of the present invention, the following effects may be anticipated.

Firstly, since a BBU is able to identify neighboring RRUs of an RRU connected with the BBU, it is able to efficiently support a user equipment in SAS (Shared Antenna System) environment.

Secondly, since a BBU is able to identify information on BBUs connected with a neighboring RRU, it is able to easily obtain and manage information on a negotiation target in a procedure of supporting a user equipment.

Thirdly, it is able to dynamically cope with a change of a network situation in a manner that main entities managing an ever changing connection relationship between a BBU and an RRU update the connection relationship between the BBU and the RRU.

It will be appreciated by persons skilled in the art that that the effects that can be achieved through the embodiments of the present invention are not limited to those described above and other advantages of the present invention will be more clearly understood from the following detailed description. That is, unintended effects according to implementation of the present invention may be devised by a person skilled in the art through the embodiments of the present invention.

DESCRIPTION OF DRAWINGS

The accompanying drawings, which are included to provide a further understanding of the invention, illustrate embodiments of the invention and together with the description serve to explain the principle of the invention. The technical features of the present invention are not limited to a specific drawing, and some of the features illustrated in the respective drawings may be combined to constitute a new embodiment. The reference numerals in the drawings represent structural elements. In the drawings.

BEST MODE

Figure 1:
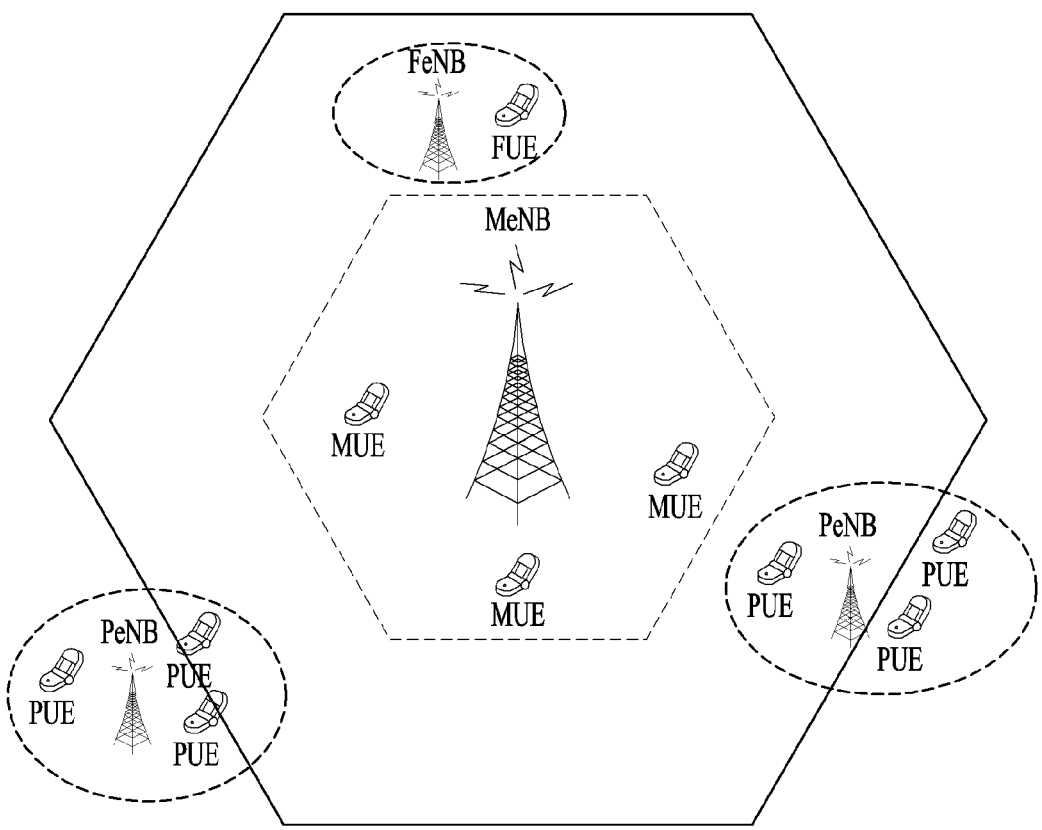
FIG. 1 is a diagram for a heterogeneous network environment associated with one embodiment of the present invention.

To achieve these and other advantages and in accordance with the purpose of the present invention, as embodied and broadly described, according to one embodiment, a method of obtaining information on an RRU (remote radio unit), which is obtained by a BBU (baseband unit) in heterogeneous cell environment in which a macro cell and a small cell coexist, includes the steps of receiving a measurement report message including information on an RRU, which transmits a reference signal to a user equipment with strength equal to or greater than a threshold value, from the user equipment through a serving RRU of the user equipment connected with the BBU and determining the RRU as a neighboring RRU of the serving RRU using the information included in the measurement report message.

The measurement report message can include an RRU ID of the neighboring RRU and information on a frequency band used by the neighboring RRU.

The method can further include the steps of transmitting a system information request message for requesting information on a BBU connected with the neighboring RRU to the user equipment and receiving a system information response message including system information received from the BBU connected with the neighboring RRU from the user equipment in response to the system information request message.

The method can further include the step of mapping the neighboring RRU to the BBU connected with the neighboring RRU based on the system information.

The system information can include information on a BBU ID of the BBU.

The method can further include the steps of transmitting an RRU information request message for requesting information on a BBU connected with the neighboring RRU to an access gateway (A-GW) managing a mapping relation between an RRU and a BBU and receiving an RRU information response message including identification information on the BBU connected with the neighboring RRU from the A-GW in response to the RRU information request message.

The method can further include the step of mapping the BBU connected with the neighboring RRU to the neighboring RRU based on the identification information.

The measurement report message can further include information on a BBU connected with the neighboring RRU together with information on the neighboring RRU.

The reference signal can include a bitmap connecting an RRU ID of the neighboring RRU and a BBU ID of a BBU connected with the neighboring RRU with each other or an ID interleaving the RRU ID and the BBU ID.

To further achieve these and other advantages and in accordance with the purpose of the present invention, according to a different embodiment, a BBU (baseband unit) obtaining information on an RRU (remote radio unit) in heterogeneous cell environment in which a macro cell and a small cell coexist includes a transmitter, a receiver and a processor configured to obtain the information on the RRU in a manner of being connected with the transmitter and the receiver, the processor configured to control the receiver to receive a measurement report message including information on an RRU, which transmits a reference signal to a user equipment with strength equal to or greater than a threshold value, from the user equipment through a serving RRU of the user equipment connected with the BBU, the processor configured to determine the RRU as a neighboring RRU of the serving RRU using the information included in the measurement report message.

It is to be understood that both the foregoing general description and the following detailed description are exemplary and explanatory and are intended to provide further explanation of the invention as claimed.

MODE FOR CARRYING OUT THE PRESENT INVENTION

Most of the terms used herein are general terms that have been widely used in the technical art to which the present invention pertains. However, some of the terms used herein may be created reflecting intentions of technicians in this art, precedents, or new technologies. Also, some of the terms used herein may be arbitrarily chosen by the present applicant. In this case, these terms are defined in detail below. Accordingly, the specific terms used herein should be understood based on the unique meanings thereof and the whole context of the present invention.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the description of the drawings, procedures or steps which render the scope of the present invention unnecessarily ambiguous will be omitted and procedures or steps which can be understood by those skilled in the art will be omitted.

In the disclosure, 'include' or 'comprise' should be interpreted as that other components may further be included, not excluded, unless otherwise specified. The term '-unit', '-or (er)', 'module', etc. signifies at least one function or operation processing unit that can be implemented in hardware, software, or a combination thereof. In addition, it is to be understood that the singular forms 'a, 'an', and 'the' include plural referents unless the context clearly dictates otherwise.

In the embodiments of the present invention, a description is made, centering on a data transmission and reception relationship between an eNB and a user equipment (UE). The eNB is a terminal node of a network, which communicates directly with a UE. In some cases, a specific operation described as performed by the eNB may be performed by an upper node of the BS.

Namely, it is apparent that, in a network comprised of a plurality of network nodes including an eNB, various operations performed for communication with a UE may be performed by the eNB, or network nodes other than the eNB. The term 'base station (BS)' may be replaced with the term 'fixed station', 'Node B', 'evolved Node B (eNode B or eNB)', an advanced base station (ABS), or an access point, etc.

In addition, the term 'mobile station (MS)' may be replaced with the term 'user equipment (UE)', 'subscriber station (SS)', 'mobile subscriber station (MSS)', 'mobile terminal', 'advanced mobile station (AMS), 'terminal', etc.

A transmitter refers to a fixed node and/or a mobile node for transmitting a data or voice service, and a receiver refers to a fixed node and/or a mobile node for receiving a data or voice service. Accordingly, in uplink, an MS becomes a transmitter and a base station becomes a receiver. Similarly, in downlink, an MS becomes a receiver and a base station becomes a transmitter.

The embodiments of the present invention are supported by standard documents disclosed in at least one of the Institute of Electrical and Electronic Engineers (IEEE) 802.xx system, the 3rd generation partnership project (3GPP) system, the 3GPP long term evolution (LTE) system and the 3GPP2 system, all of which are wireless access systems. That is, the steps or the portions of the embodiments of the present invention which are not described in order to clarify the technical spirit are supported by the above-described documents.

All the terms disclosed in the present specification may be described by the above-described standard documents. In particular, embodiments of the present invention can be supported by one or more of P802.16e-2004, P802.16e-2005, P802.16.1, P802.16p, and P802.16.1b standard documents that are standard documents of the IEEE 802.16 system.

Hereinafter, preferred embodiments of the present invention will be described with reference to the accompanying drawings. It is to be understood that the detailed description which will be disclosed along with the accompanying drawings is intended to describe the exemplary embodiments of the present invention, and is not intended to describe a unique embodiment through which the present invention can be carried out.

The specific terms used in the following description are provided in order to facilitate the understanding of the present invention and may be changed in other forms without departing from the technical scope of the present invention.

1. Heterogeneous Network Environment

FIG. 1 is a diagram for a heterogeneous network environment associated with one embodiment of the present invention.

To guarantee a more stable data service such as multimedia service in future-generation mobile communication, much attention has been attracted to a hierarchical cell structure or heterogeneous cell structure in which small cells (e.g., pico cells or femto cells) for low power/near field communication are co-located within a macro cell-based homogeneous network. This is because installation of additional macro eNode Bs is inefficient in terms of cost and complexity relative to system performance improvement.

A heterogeneous network configuration under consideration for a future-generation communication network may be formed as illustrated in FIG. 1. A plurality of small cells may coexist in one macro cell and each of a plurality of the small cells serves corresponding UEs by resource allocation based on a cell coordination scheme. As one of core technologies for implementing the aforementioned heterogeneous network environment, it may be able to separately implement an RRU (remote radio unit) and a BBU (baseband unit).

2. Cloud RAN Environment in which RRU and BBU are Separated from Each Other

Figure 2:
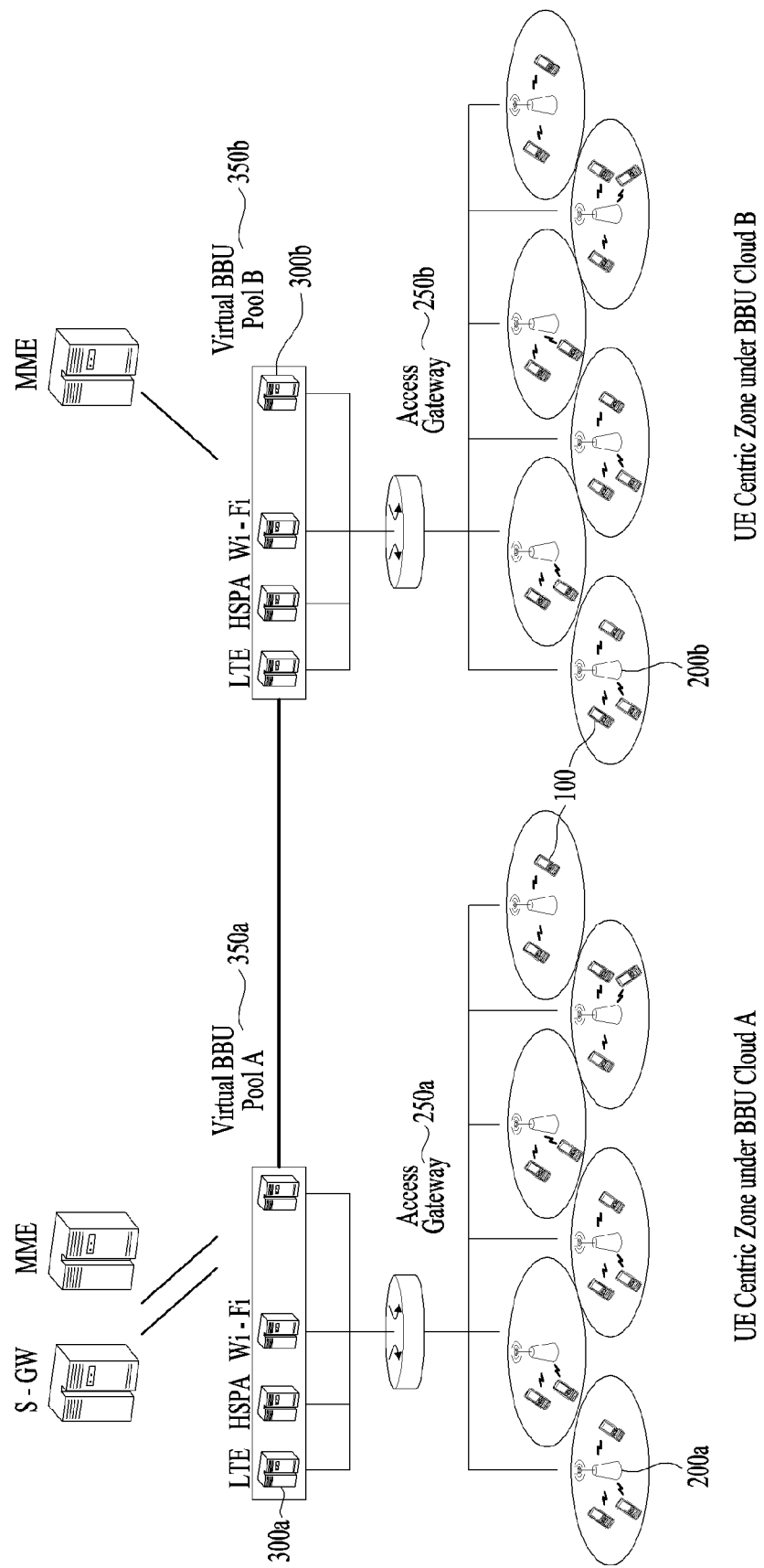
FIG. 2 is a diagram for a cloud RAN (cloud radio access network) environment associated with one embodiment of the present invention.

FIG. 2 is a diagram for a cloud RAN (C-RAN) environment associated with one embodiment of the present invention. The cloud RAN environment can consist of a plurality of RRUs 200a/200b, a software-based virtual BBU pool 350a/350b or a virtual base station (VBS) and an access control/resource management/authentication server controlling the same and the like. Since elements of a core network change into an open IP network in the cloud RAN environment, many elements of the cloud RAN are directly interlocked with the elements of the core network in an organic relation.

Meanwhile, as an example of implementing the cloud RAN environment, as mentioned in the foregoing description, there may exist environment in which RRUs 200a/200b and BBUs 300a/300b are separated from each other. According to the separation of the RRUs and the BBUs, it may be able to compose cloud RAN environment including characteristics described in the following.

Firstly, a virtual BBU pool 350a/350b exists and includes a plurality of BBUs 300a/300b. The virtual BBU pool 350a/350b has a structure of being associated with SAS (shared antenna system) RRUs 200a/200b supporting Multi-RAT (multi-radio access technology) through an access gateway 250a/250b. The virtual BBU pool 350a/350b includes a plurality of BBUs 300a/300b supporting various wireless access technologies and one RRU 200a/200b can be associated with one or more BBUs 300a/300b. On the contrary, one BBU 300a/300b can be associated with one or more RRUs 200a/200b. BBUs 300a/300b belonging to the virtual BBU pool 350a/350b can be connected with the RRUs 200a/200b via an ideal/non-ideal backhaul and one virtual BBU pool 350a can be connected with another virtual BBU pool 350b via X2 interface or an interface similar to the X2 interface.

Secondly, all RRUs 200a/200b belonging to the virtual BBU pool 350a/350b have an identical virtual cell ID and all BBUs 300a/300b and all RRUs 200a/200b belonging to the virtual BBU pool 350a/350b are connected with each other via an ideal backhaul. An RRU 200a/200b is controlled by a BBU 300a/300b associated with the RRU.

Thirdly, a synchronization signal used for obtaining downlink synchronization is transmitted by each of the RRUs 200a/200b and the synchronization signal can be transmitted in a manner of including not only a virtual cell ID capable of representing the virtual BBU pool 350a/350b to which the RRUs 200a/200b belong thereto but also an RRU ID capable of representing each of the RRUs 200a/200b.

Fourthly, each of the RRUs 200a/200b assumes a simple antenna and L1/L2/L3 layer processing is processed by the BBUs 300a/300b belonging to the virtual BBU pool 350a/350b. And, the RRUs 200a/200b may have an attribute of SAS and it indicates that the RRUs 200a/200b may belong to another BBU from one BBU in the virtual BBU pool 350a/350b. In particular, time-variable belonging of the RRUs 200a/200b may change from one BBU to another BBU according to a situation (e.g., load of the BBUs, an available resource status, etc.) of the BBUs 300a/300b.

According to a legacy technology, there exists a physical cell and users receive a service by accessing the cell. Yet, as mentioned in the foregoing description, when an RRU and a BBU are implemented in a manner of being separated from each other, a network configures a zone capable of providing optimized communication environment in a user unit and provides a user with a zone-based service.

3. Method for BBU to Obtain Information on RRU

In the following, a method for a BBU to obtain information on neighboring RRUs of an RRU connected with the BBU is described. If two or more RRUs are 'neighboring' (adjacent to each other), it indicates a situation that a user equipment performing communication in a manner of being connected with one RRU is able to receive a signal from another RRU with strength equal to or greater than a prescribed strength. In particular, when a user equipment is able to detect a signal equal to or greater than a prescribed strength from a different RRU except a serving RRU supporting the user equipment, the serving RRU and the different RRU are in a relationship adjacent to each other.

A BBU can identify a neighboring RRU of an RRU (i.e., a serving RRU of a user equipment) connected with the BBU based on a measurement report message of a user equipment considering the BBU as a serving BBU of the user equipment. In the following description, although it is explained as the BBU obtains and manages a list of neighboring RRUs of the RRU, a main entity of obtaining information on RRUs may become a different entity, unit, server or the like that performs scheduling and resource management in C-RAN environment.

Figure 3:
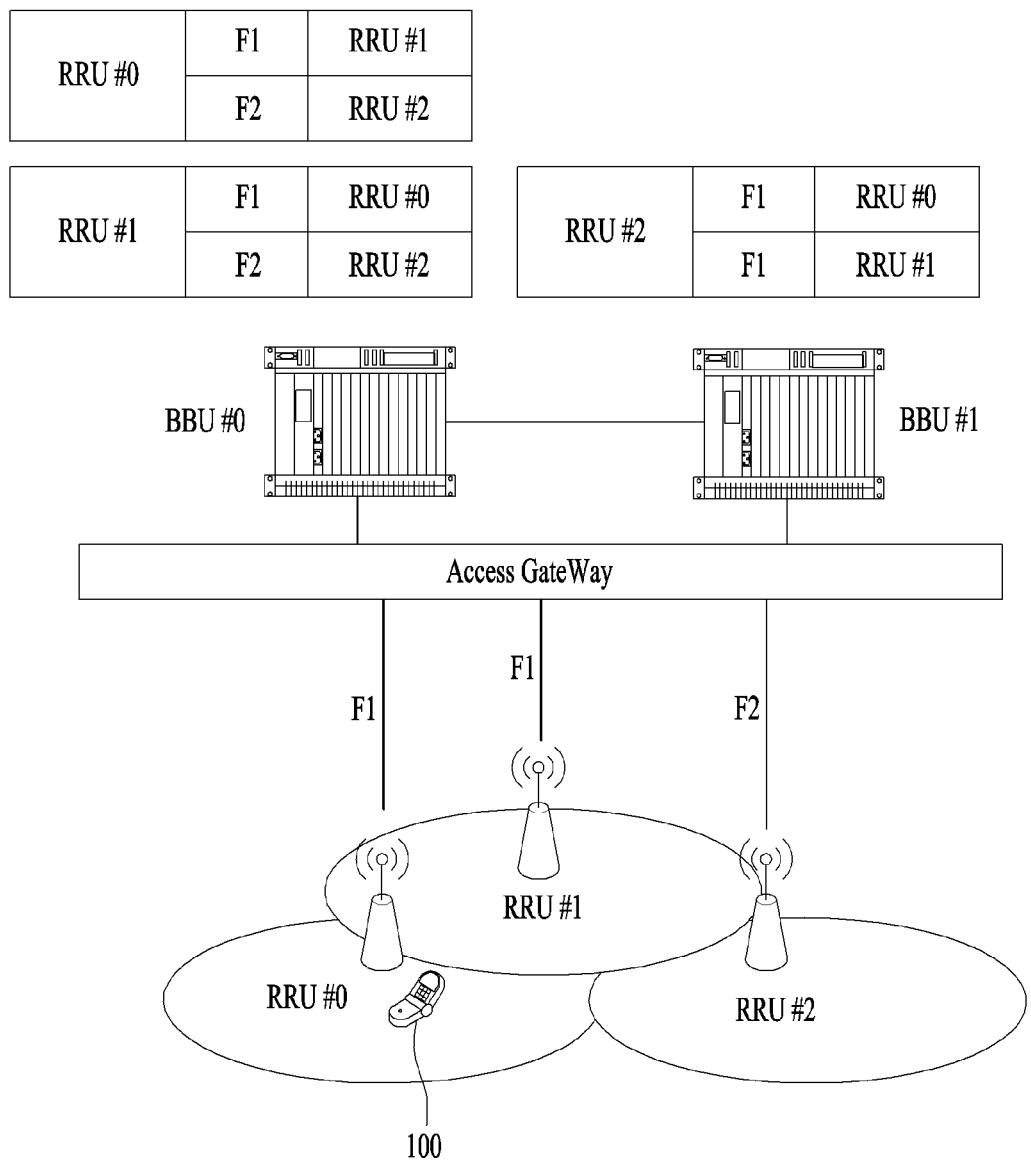
FIG. 3 is a diagram for explaining a method of obtaining RRU information associated with one embodiment of the present invention.
Figure 4:
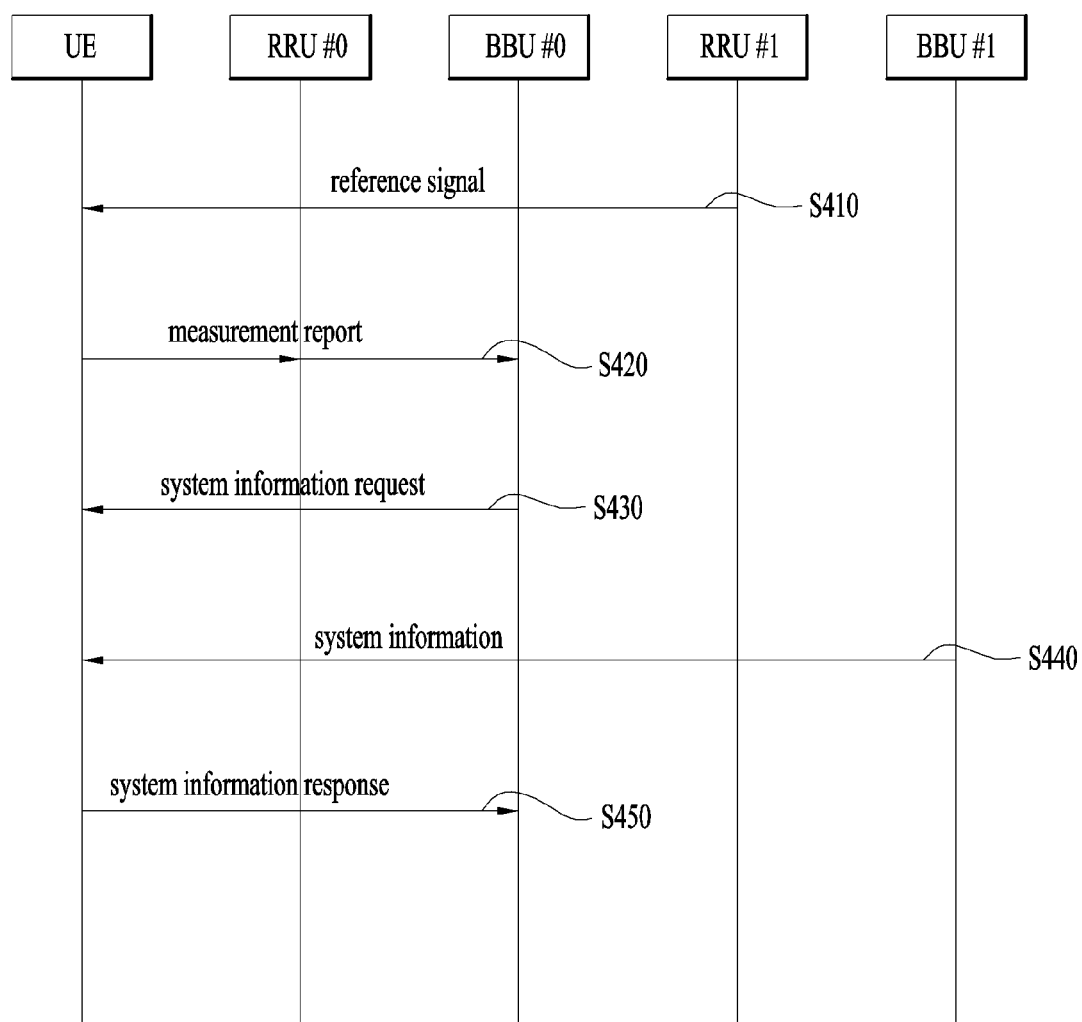
FIG. 4 is a flowchart for explaining a method of obtaining RRU information associated with one embodiment of the present invention.
Figure 5:
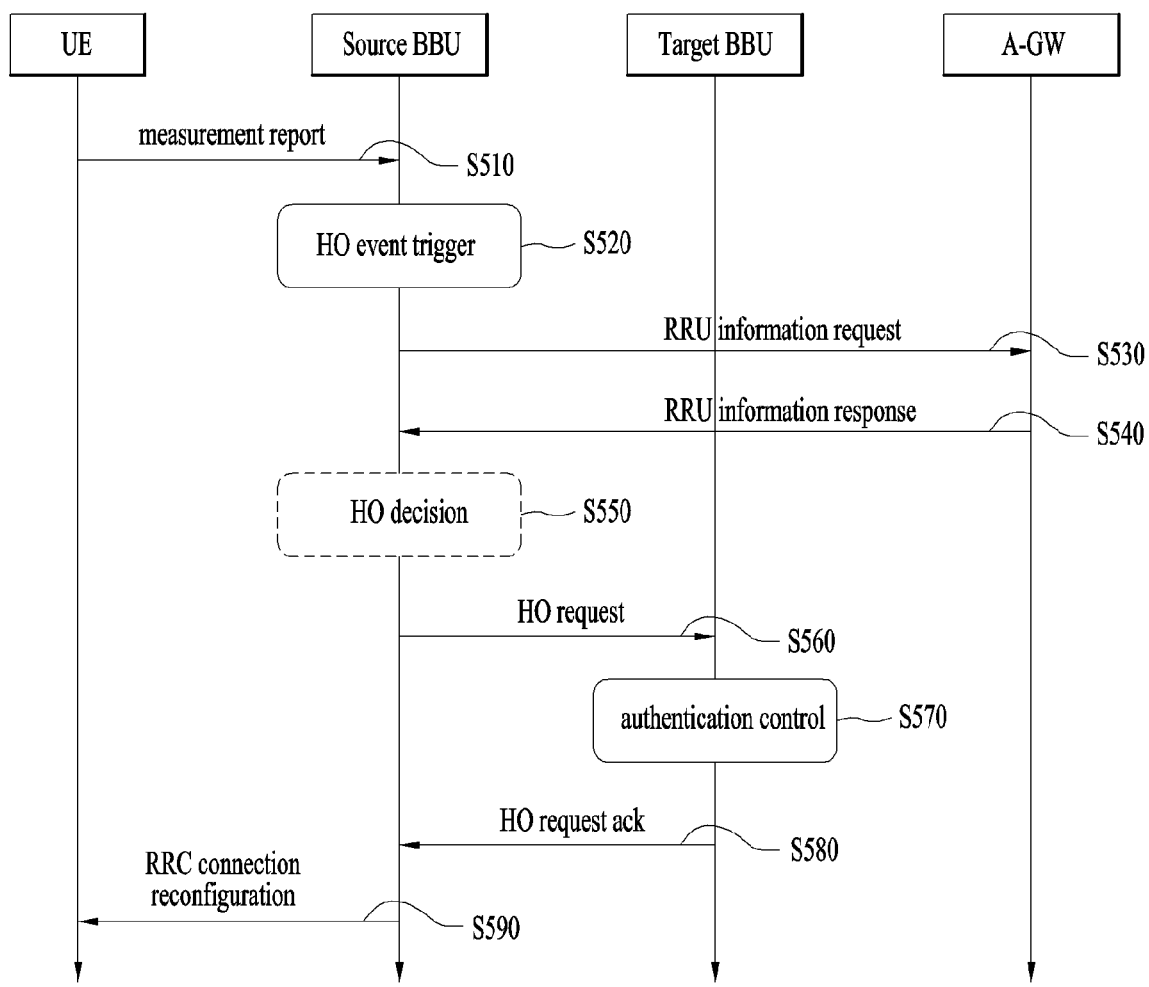
FIG. 5 is a flowchart for explaining a method of obtaining RRU information associated with one embodiment of the present invention.

Meanwhile, the BBU can obtain the list of neighboring RRUs in various ways. FIGS. 3 to 5 explain a case that a reference signal, which is transmitted to a user equipment by an RRU, includes information on the RRU only and FIG. 6 and FIG. 7 explain a case that a reference signal includes both information on an RRU and BBU information mapped to corresponding RRUs.

FIG. 3 is a diagram for explaining a method of obtaining RRU information associated with one embodiment of the present invention.

An RRU transmits a reference signal (or pilot signal) consisting of an RRU ID of the RRU or an RRU-specific physical ID to a user equipment. The user equipment receive the reference signal from a neighboring RRU instead of a serving RRU. If strength of the received reference signal is equal to or greater than a predetermined threshold, the user equipment transmits a measurement report message on the neighboring RRU to a serving BBU through the serving RRU of the user equipment.

The measurement report message can include an RRU ID (e.g., a physical ID, a PCID (physical cell ID), an ECGI (evolved cell global identifier), a TAC (tracking area code), a PLMN (public land mobile network) ID, a CSG (closed subscriber group) ID and the like) and information on a frequency band used by an RRU. A BBU can distinguish a specific RRU from cells transmitted from the RRU via the information. In this case, the information on the frequency band may use a specific value predetermined by mapping to each frequency band or may reuse a PCID. Having received the measurement report message, a serving BBU can obtain information (RRU list) on neighboring RRUs of a serving RRU connected with the serving BBU.

Referring to an example of FIG. 3, a BBU #0 and a BBU #1 obtain information on a neighboring RRU of RRUs respectively connected to the BBU #0 and the BBU #1 (an RRU #0 and an RRU #1 for the BBU #0 and an RRU #2 for the BBU #1) and may be then able to store and manage the information on a list of the neighboring RRU. For example, the BBU #0 can determine the RRU #1 and the RRU #2 as the neighboring RRUs of the RRU #0 connected with the BBU #0 based on the measurement report message. Subsequently, the BBU #0 can manage the RRU #1 using F1 frequency band and the RRU #2 using F2 frequency band as the neighboring RRUs of the RRU #0. And, the BBU #0 can also manage information on the RRU #0 using the F1 frequency band and information on the RRU #2 using the F2 frequency band as the neighboring RRUs of the RRU #1 corresponding to another RRU connected with the BBU #0.

Meanwhile, if a connection or a mapping relation between a BBU and an RRU corresponds to a UE-specific relation, a BBU-RRU mapping relation according to a UE ID and a list of neighboring RRUs of a specific RRU can be separately managed. In particular, although UEs are positioned within coverage of the same BBU, since RRUs connected with each of the UEs may be different from each other, a list of neighboring RRUs can be differently configured depending on a UE. Or, a BBU can manage a list of neighboring RRUs of all RRUs connected with the BBU in a manner of integrating the list. In particular, the BBU combines all measurement report messages received from all UEs with each other and may be then able to store and manage a single list of neighboring RRUs.

FIG. 4 is a flowchart for explaining a method of obtaining RRU information associated with one embodiment of the present invention. Referring to FIG. 4, an RRU #0 performs communication with a user equipment as a serving RRU of the user equipment in a manner of being connected with a BBU #0. The BBU #0 supports the UE as a serving BBU of the user equipment. Meanwhile, an RRU #1 is connected with a BBU #1 and the RRU #1 corresponds to a neighboring RRU of the RRU #0.

First of all, the RRU #1 transmits a reference signal to a user equipment [S410]. The user equipment, which has an RRU #0 as a serving RRU, can receive the reference signal transmitted from the RRU #1 adjacent to the RRU #0.

Meanwhile, if the reference signal received in the step S410 is equal to or greater than a threshold value, the user equipment can check that the RRU #1 corresponds to an RRU adjacent to the RRU #0. Hence, the user equipment transmits a measurement report message on the RRU #1 to a BBU #0 via the RRU #0 corresponding to the serving RRU of the user equipment [S420]. The BBU #0 can collect and manage information on the RRU #1 adjacent to the RRU #0 from the received measurement report message.

Meanwhile, in legacy network environment, a coordination procedure is performed between base stations in a process of supporting a user equipment. On the contrary, as mentioned in the foregoing description, in C-RAN environment in which an RRU and a BBU are separated from each other, it is necessary to have a coordination procedure between BBUs which are connected with neighboring RRUs, respectively. Yet, a specific BBU is not aware of a BBU to which RRUs adjacent to an RRU mapped to the specific BBU is mapped. Hence, if a BBU receives a measurement report message from a user equipment, in order to support the user equipment, it is necessary for the BBU to identify a BBU with which a coordination procedure is performed.

For example, in the step S420 of FIG. 4, the BBU #0 is able to know that the RRU #0 and the RRU #1 are adjacent to each other by receiving the measurement report message on the RRU #1. Yet, the BBU #0 is unable to know a BBU having a mapping relation with the RRU #1. It is necessary for the BBU #0 to obtain information on a BBU connected with the RRU #1 to newly add a relationship between the user equipment and the RRU #1 or eliminate interference to the user equipment from the RRU #1. Or, if two or more BBUs transceive data with the user equipment via the RRU #1, the two or more BBUs should allocate resources in consideration of communication capacity of the RRU #1. Hence, it is necessary for the BBU #0 to obtain information on other BBUs connected with the RRU #1.

In the following, embodiments for a BBU to obtain information on a BBU connected with neighboring RRUs of an RRU mapped to the BBU are explained. The steps S430 to S450 of FIG. 4 explain an embodiment that a user equipment collects information of BBUs and delivers the information to a serving BBU. FIG. 5 explains an embodiment that the serving BBU directly collects the information on the BBUs.

If a measurement report message on the RRU #1 is received [S420], the BBU #0 wants to obtain information on a BBU (i.e., BBU #1) connected with the RRU #1. Hence, the BBU #0 transits a system information request message to the user equipment [S430]. The system information request message corresponds to a message for asking the user equipment to receive and deliver system information transmitted from the BBU connected with the RRU #1.

Having received the system information request message, the user equipment receives system information transmitted via the RRU #1 from the BBU #1 [S440]. The user equipment obtains a BBU ID (e.g., a PCID, an ECGI, a TAC, a PLMN ID, a CSG ID, a cell ID and the like) corresponding to identification information on the BBU #1 from the system information. Subsequently, the user equipment transmits a system information response message to the BBU #0 [S450]. The system information response message can include a BBU ID of the BBU #1 obtained by the user equipment. Meanwhile, the cell ID corresponding to an example of the BBU IDs can be extended to bits equal to or greater than 8 bits in consideration of C-RAN environment.

FIG. 5 is a flowchart for explaining a method of obtaining RRU information associated with one embodiment of the present invention. Unlike FIG. 4, FIG. 5 explains an embodiment for a BBU to directly obtain information on a BBU connected with neighboring RRUs of an RRU mapped to the BBU.

Having received a measurement report message including information on an RRU adjacent to a serving RRU from a user equipment, a BBU transmits an RRU information request message to an A-GW (access gateway), an entity, a unit or a server that manages information on a BBU-RRU mapping relation. Subsequently, the BBU is able to know a BBU mapped to a neighboring RRU in a manner of receiving an RRU information response message from a main entity managing the BBU-RRU mapping relation. And, if interface configuration is not set between BBUs, the BBU may be able to set an interface (e.g., X2 interface) between BBUs based on the obtained information.

Meanwhile, the aforementioned procedure is not performed only when the BBU manages a list of neighboring RRUs. For example, if a specific user equipment moves to an RRU connected with a different BBU rather than a serving BBU, or if the specific user equipment moves to a different BBU pool in a manner of deviating from coverage of a BBU pool (in the following, this is referred to as handover for clarity), it may be necessary to have information on a BBU to which an RRU newly connected with the user equipment is mapped.

FIG. 5 explains a procedure necessary for one BBU to obtain information on another BBU in the aforementioned handover process. Similar to the BBU #0 in FIG. 4, a source BBU indicates a serving BBU of a user equipment, Similar to the BBU #1 in FIG. 4, a target BBU indicates a BBU rather than the serving BBU.

The user equipment transmits a measurement report message to the source BBU to indicate that a signal is received from a neighboring RRU with strength equal to or greater than a threshold value [S510]. The source BBU determines whether to make a handover of the user equipment based on the measurement report message received from the user equipment. In particular, the measurement report message may become a trigger of a handover event [S520]. For example, if RSRP (reference signal received power) of a reference signal received from a neighboring RRU by the user equipment satisfies measurement event 3 in LTE (long term evolution), the RSRP of the received reference signal may become a trigger of a handover event.

Meanwhile, in a process of supporting the handover event of the user equipment, the BBU is unable to know information on the target BBU in advance. Hence, the source BBU, which has triggered the handover event, transmits an RRU information request message to an A-GW, an entity, a unit or a server that manages information on the BBU-RRU mapping relation [S530]. The RRU information request message can include a field indicating at least one selected from the group consisting of information on a message type, information on an ID of an RRU in which the handover event is triggered, information on a frequency of an RRU, information on an ID (or a TED (tunnel endpoint identifier)) of the source BBU and information on an ID of an A-GW, an entity, a unit or a server. The RRU information request message can be transmitted via a wireless or wired backhaul between the source BBU and the A-GW, the entity, the unit or the server.

Having received the RRU information request message, the A-GW, the entity, the unit or the server transmits information on the target BBU mapped to a requested RRU to the source BBU in a manner of including the information in an RRU information response message [S540]. The RRU information response message can include a field indicating at least one selected from the group consisting of information on a message type, information on an RRU ID, information on a frequency of an RRU, information on an ID of the target BBU connected with an RRU, information on an ID of the source BBU, load information of the target BBU and information on an ID of an A-GW, an entity, a unit or a server.

The source BBU determines whether to make a handover of the user equipment based on the received RRU information response message [S550] and transmits a handover request message to the target BBU [S560]. Subsequently, a series of steps including the step S570 to the step S590 that the target BBU accepts the handover and the user equipment makes a handover to the target BBU from the source BBU can be implemented in a manner of being similar to a legacy handover process.

And, the step S530 and the step S540 that the source BBU transmits the RRU information request message to the A-GW and receives the RRU information response message can be performed in various situations and at various timings. For example, the process of transmitting and receiving the RRU information request/response message can be performed before/after an RRU is switched according to a movement of the user equipment or a connection with a new RRU is added, before interference between neighboring RRUs is controlled, or before/after CoMP (coordinated multipoint) or inter-site carrier aggregation is performed.

Specifically, for example, when a user equipment receives data from the BBU #0 in a manner of being connected with the RRU #0, if the user equipment moves and becomes close to the RRU #1, the BBU #0 can change an RRU connected with the user equipment to the RRU #1 from the RRU #0 or may simply add a connection relation with the RRU #1. In this case, since the RRU #1 may already support a different user equipment, it may be necessary for the BBU #0 to have a coordination procedure regarding a resource of the RRU #1. Hence, the BBU #0 corresponding to the source BBU makes a request for information on BBUs transmitting and receiving data via the RRU #1 to the A-GW, obtains the information and may be then able to perform the coordination procedure regarding a resource or interference control with the BBUs.

Figure 6:
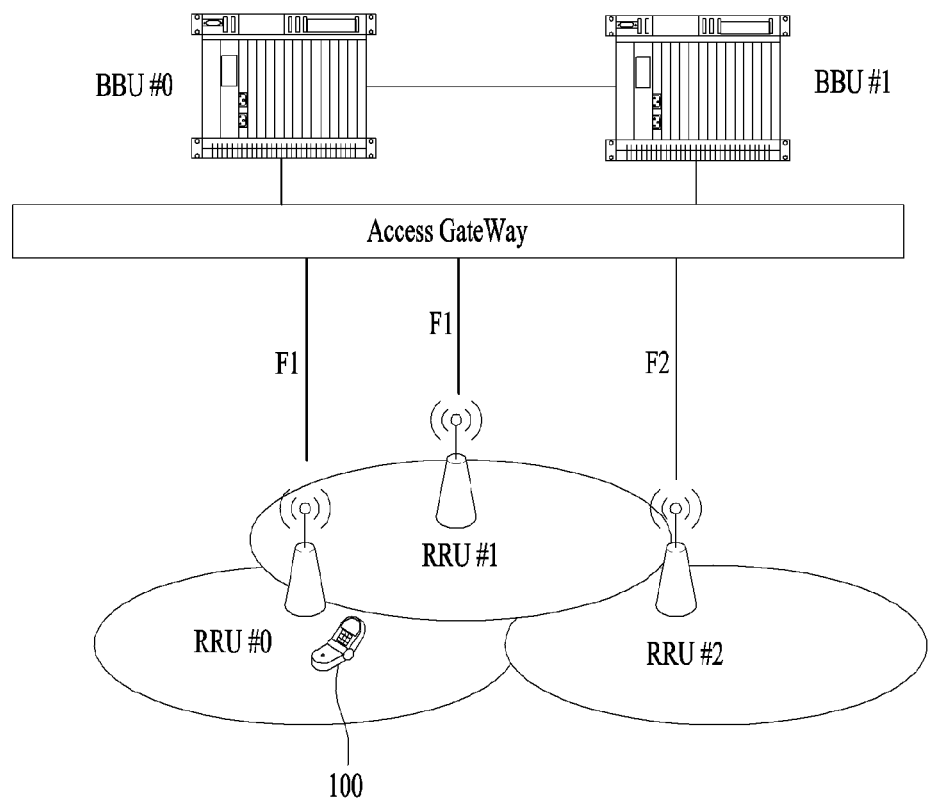
FIG. 6 is a diagram for explaining a method of obtaining RRU information associated with one embodiment of the present invention.

FIG. 6 is a diagram for explaining a method of obtaining RRU information associated with one embodiment of the present invention. As mentioned in the foregoing description, FIGS. 6 and 7 explain a case that information on an RRU is included in a reference signal together with information on a BBU mapped to RRUs.

RRUs are able to know information on a mapping relation with a BBU in advance and may be able to transmit information on an ID of a BBU connected with the RRUs to a user equipment in a manner of including the information on the ID of the BBU in a reference signal or a pilot signal. If strength of the reference signal received from an RRU adjacent to a serving RRU is equal to or greater than a threshold value, the user equipment transmits a measurement report message on the RRU adjacent to the serving RRU to a serving BBU. By doing so, the serving BBU can obtain not only information on RRUs adjacent to the serving RRU of the user equipment but also information on BBUs connected with the RRUs adjacent to the serving RRU of the user equipment.

In an embodiment shown in FIG. 6, a BBU #0 can receive information on an RRU #0 connected with the BBU #0 and information on RRUs adjacent to an RRU #1 from a user equipment and may be able to manage the information. Moreover, the BBU #0 can also manage information on BBUs having a mapping relation with the neighboring RRUs. For example, the BBU #0 is able to know that there exist an RRU #1 using F1 frequency and an RRU #2 using F2 frequency as RRUs adjacent to an RRU #0, which is connected with the BBU #0. Moreover, the BBU #0 is also able to know that the RRU #1 adjacent to the RRU #0 is mapped to the BBU #0 and the RRU #2 is mapped to the BBU #1.

Figure 7:
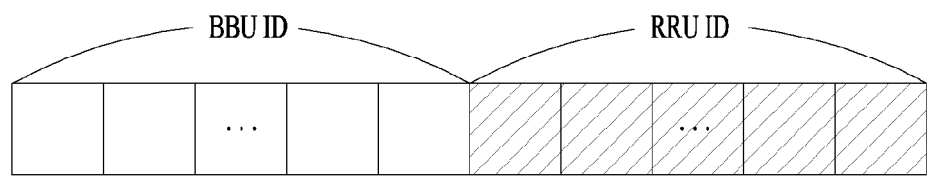
FIG. 7 is a diagram for explaining RRU information associated with one embodiment of the present invention.

FIG. 7 is a diagram for explaining RRU information associated with one embodiment of the present invention.

In an embodiment of FIG. 7, a reference signal received from an RRU by a user equipment can be configured in a manner of connecting an RRU ID and a BBU ID with each other by a bitmap. Or, a new ID can be configured in a manner of interleaving the RRU ID and the BBU ID. The aforementioned implementation examples can be defined in advance among a user equipment, an RRU and a BBU. A base station configures a synchronization signal and a cell CRS (cell common reference signal) using a new ID and may be able to transmit the synchronization signal and the cell CRS. The new ID can be used in a physical layer in a manner of replacing a legacy PCDI with the new ID. It is able to additionally define an ID capable of distinguishing an RRU from a BBU in a network.

In embodiments of FIG. 6 and FIG. 7, a BBU can obtain a list of neighboring RRUs and information on a BBU mapped to RRUs based on a measurement report message received from a user equipment. Hence, the steps S430 to S450 of FIG. 4 and a procedure of transmitting and receiving an RRU information request/response message via an A-GW in FIG. 5 can be omitted.

4. Method for BBU to Update RRU Information

In the aforementioned SAS (shared antenna system) environment, a mapping relation between a BBU and an RRU can be dynamically or statically changed. For example, if there is a small number of user equipments supported by a specific BBU, the BBU turns off power of the BBU to reduce power consumption and may be able to change a mapping relation between a BBU and an RRU to make a different BBU support RRUs belonging to the coverage of the specific BBU. Or, if an available resource of the specific BBU is not sufficient, all of a part of the coverage of the BBU can be supported by a different BBU. A mapping relation between a BBU and an RRU can be performed for load balancing. If the mapping relation between the BBU and the RRU corresponds to a UE-specific mapping relation, the mapping relation may change according to a movement of a user equipment.

Hence, it is necessary for an A-GW, an entity, a server or the like managing the mapping relation between the BBU and the RRU to update the ever-changing mapping relation. In the following, a procedure for a BBU to update information on an RRU mapped to the BBU is explained. Meanwhile, a mapping relation change can be performed in a manner that an RRU switches a connected BBU, a connection relation with a new BBU is added to an RRU, a relation currently connected with a BBU is released in an RRU and the like.

Figure 8:
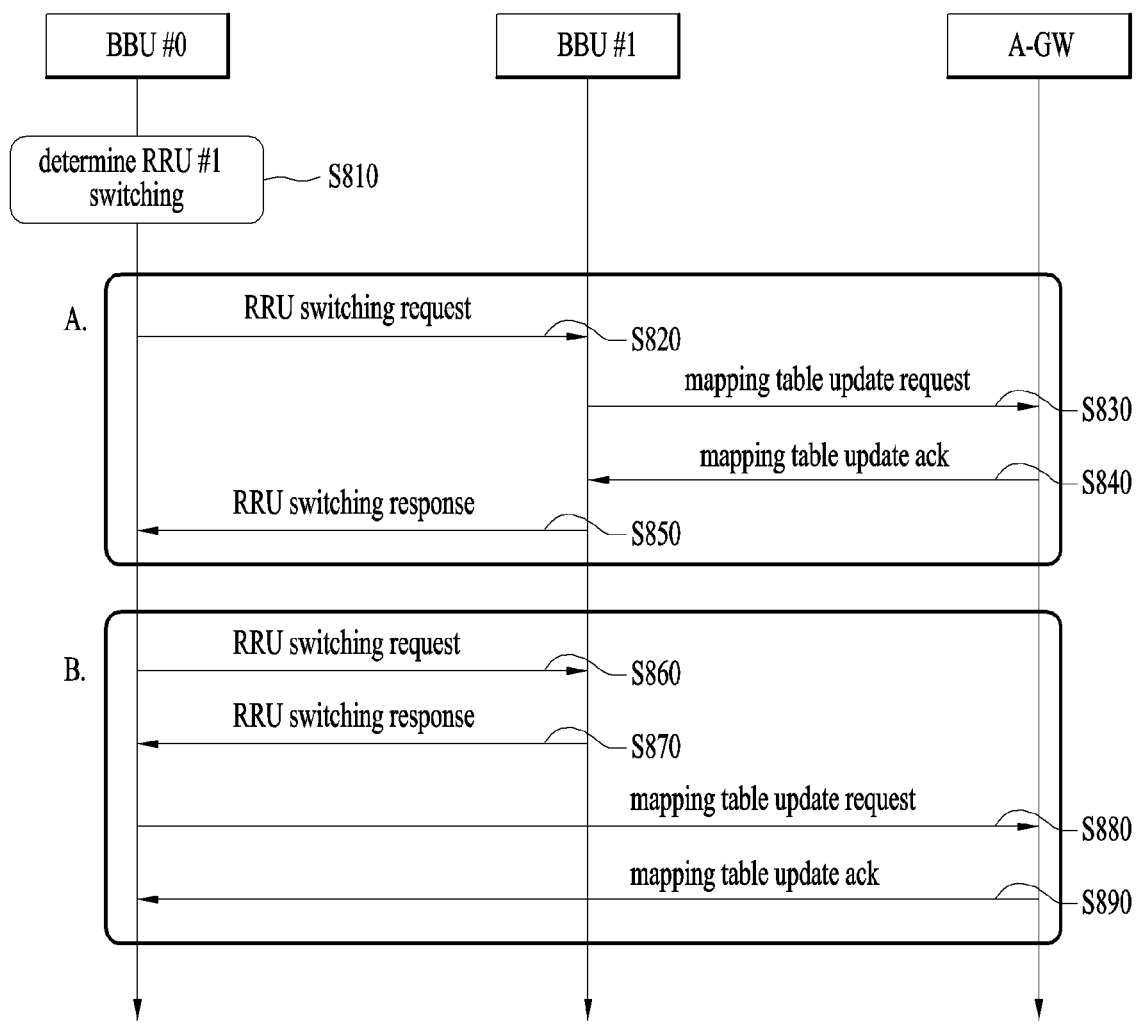
FIG. 8 is a flowchart for explaining a method of updating RRU information associated with one embodiment of the present invention.

FIG. 8 is a flowchart for explaining a method of updating RRU information associated with one embodiment of the present invention.

First of all, as mentioned in the foregoing description, in many cases, a BBU #0 releases a connection established with an RRU #1 which is mapped to the BBU #0 and determines switching of the RRU #1 to make the RRU #1 connect with a BBU #1 [S810]. The BBU #0 transmits an RRU switching request message to the BBU #1 to which the RRU #1 is switched [S820]. The RRU switching request message ca include at least one selected from the group consisting of a field indicating a message type, a field indicating an ID (C-RNTI, etc.) of a user equipment, a field indicating an ID of a BBU with which a switching target RRU intends to connect, a field indicating an ID of a switching target RRU and context information of a user equipment.

Having received the RRU switching request message, the BBU #1 checks whether or not the BBU #1 is able to secure QoS of the user equipment, forms a mapping relation with the RRU #1 and determines to support a service to the user equipment. Subsequently, the BBU #1 transmits a mapping table update request message to an A-GW [S830]. The mapping table update request message can include at least one selected from the group consisting of a field indicating a message type, a field indicating that RRU switching is performed among RRU add/release/switching, a field indicating an ID of a switching target RRU, a field indicating an ID of a BBU with which an RRU is used to be connected, a field indicating an ID of a BBU with which an RRU is to be connected, a field indicating an ID of a user equipment, and an ID of an A-GW or a server managing a mapping relation between a BBU and an RRU.

Meanwhile, the field indicating the RRU switching can include an indicator to indicate whether a change of the mapping relation between a BBU and an RRU is to switch a target RRU or add/release a connection relation between an RRU and a BBU.

The A-GW updates/modifies a mapping table managed by the A-GW according to the mapping table update request message and records that the RRU #1, which is used to be connected with the BBU #0, is connected with the BBU #1. Subsequently, the A-GW transmits a mapping table update Ack message to the BBU #1 [S840]. The mapping table update Ack message can include at least one selected from the group consisting of a field indicating a message type, a field indicating an ID of a switching target RRU, a field indicating an ID of a BBU with which an RRU is used to be connected, a field indicating an ID of a BBU with which an RRU is newly connected, a field indicating an ID of a user equipment, and an IP of an A-GW.

Having received the mapping table update ACk message, the BBU #1 is able to know that the RRU #1 is to be connected with the BBU #1 and forms a mapping relation with the RRU #1. And, the BBU #1 transmits an RRU switching response message to the BBU #0 [S850]. The RRU switching response message can include at least one selected from the group consisting of a field indicating a message type, a field indicating an ID of a user equipment, a field indicating that RRU switching is performed among RRU add/release/switching, a field indicating an ID of a BBU with which a switching target RRU is used to be connected, and a field indicating an ID of a switching target RRU.

In the foregoing description, an embodiment that the BBU #1, which has received the RRU switching request message, transmits the RRU switching response message to the BBU #0 after the mapping table update request/Ack message is transceived with the A-GW is explained (block A of FIG. 8).

According to a different embodiment shown in a block B of FIG. 8, if it is determined to support the user equipment via the RRU #1 according to a request of the BBU #0, the BBU #1 may be able to preferentially transmit the RRU switching response message to the BBU #0 before asking the A-GW to update the mapping table [S860. S870]. Subsequently, unlike the aforementioned embodiment, if the BBU #0 knows that switching of the RRU #1 is determined, the BBU #0 transmits a mapping table update request to the A-GW [S880]. The A-GW updates a mapping relation between a BBU and an RRU, stores the mapping relation an transmits a mapping table update Ack message to the BBU #0 to inform the BBU #0 that the mapping relation is newly modified [S890].

The BBU #0 forms a new mapping relation in a manner of switching the RRU #1 into the BBU #1. Subsequently, the BBU #0 or the BBU #1 transmits an RRC reconfiguration message to the user equipment to inform the user equipment that the switching of the RRU #1 has been performed. Information received through the mapping table update Ack message can be similarly included in the RRC reconfiguration message. The user equipment can update information on an RRU supporting the user equipment by receiving the RRC reconfiguration message.

Figure 9:
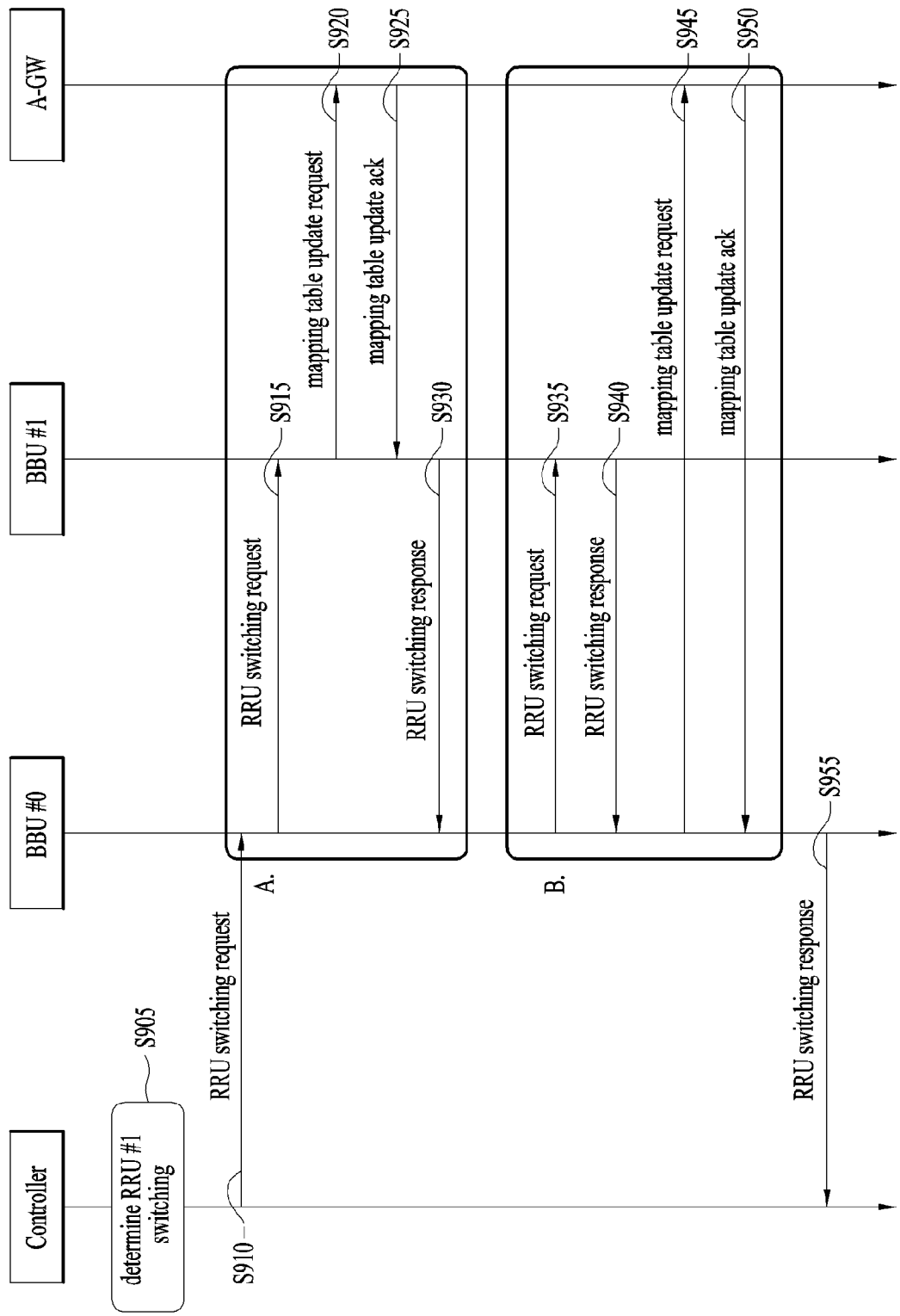
FIG. 9 is a flowchart for explaining a method of updating RRU information associated with one embodiment of the present invention.

FIG. 9 is a flowchart for explaining a method of updating RRU information associated with one embodiment of the present invention.

In FIG. 8, an embodiment that a BBU connected with a switching target RRU directly determines switching of an RRU has been explained. In FIG. 9, an embodiment that a specific server, an entity or a controller (e.g., MME (mobility management entity) or RRM (radio resource management), etc.) instead of a BBU determines switching of an RRU is explained.

In FIG. 9, a controller determines switching of an RRU #1 [S905] and transmits an RRU switching request message to a BBU #1 to which the RRU #1 is connected [S910]. The RRU switching request message in the step S910 can be implemented in a manner of being identical or similar to the embodiment of FIG. 8. Having received the RRU switching request message from the controller, the BBU #0 is able to know that it is necessary to switch the RRU #1 connected with the BBU #0 to the BBU #1 and may be able to perform a process of block A or a process of block B. A series of processes shown in the block A/B of FIG. 9 can be implemented in a manner of being identical or similar to FIG. 8.

If processes of the steps S915 to S930 or processes of the steps S935 to S950 are performed, the BBU #0 transmits an RRU switching response message to the controller, which has determined the switching of the RRU #1 [S955]. The BBU #0 may perform the step S955 in a manner of modifying a part of the RRU switching response message received from the BBU #1 and delivering the modified RRU switching response message to the controller. Subsequently, the BBU #0 or the BBU #1 transmits an RRC reconfiguration message to a user equipment to indicate that the switching of the RRU #1 has been performed.

Figure 10:
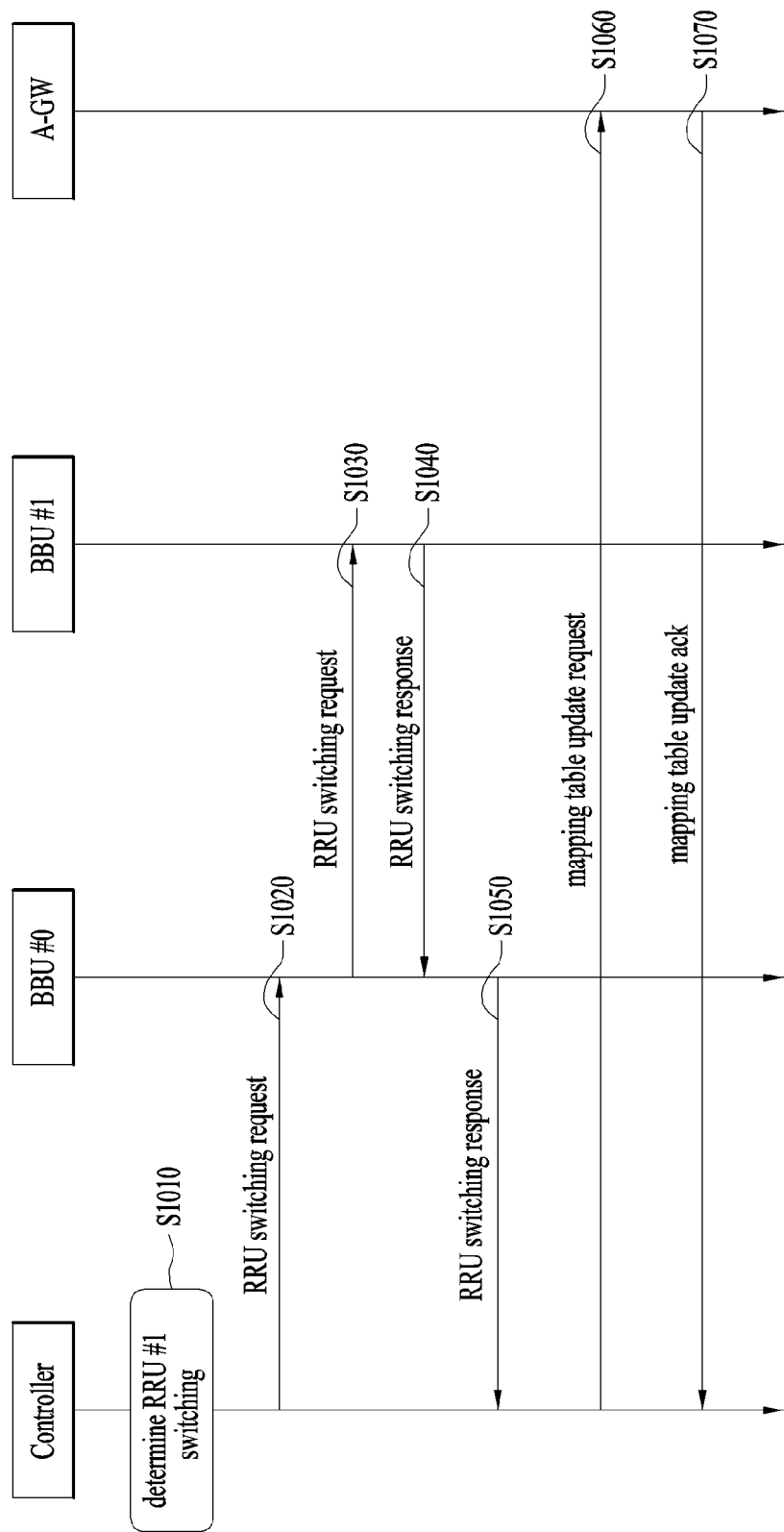
FIG. 10 is a flowchart for explaining a method of updating RRU information associated with one embodiment of the present invention.

FIG. 10 is a flowchart for explaining a method of updating RRU information associated with one embodiment of the present invention.

In FIG. 8 and FIG. 9, embodiments that the BBU #0 with which the RRU #1 is connected or the BBU #1 with which the RRU #1 is newly connected transceives a mapping table update request/ack message with the A-GW have been explained. In FIG. 10, an embodiment that the controller, which has determined switching of the RRU #1, instead of the BBU #0 and the BBU #1 transceives the mapping table update request/ack message with the A-GW is explained.

In FIG. 10, processes of the steps S1010 to S1040 can be performed in a manner of being identical or similar to the processes of the steps S905, S910, S935 and S940 of FIG. 9. In FIG. 10, having received the RRU switching response message from the BBU #1, the BBU #0 delivers the RRU switching response message to the controller [S1050].

Having received the RRU switching response message, the controller is able to know that a mapping relation of the RRU #1 is switched to the BBU #1 from the BBU #0.

Subsequently, the controller transmits a mapping table update request message to the A-GW [S1060] and receives a mapping table update response message from the A-GW in response to the mapping table update request message [S1070]. In particular, in the embodiment of FIG. 10, a different main entity instead of a BBU asks the A-GW to update a mapping relation between a BBU and an RRU.

Although it is not explicitly shown, after the step S1070 is performed, the BBU #0 or the BBU #1 transmits an RRC reconfiguration message to a user equipment to indicate that the switching of the RRU #1 has been performed.

Figure 11:
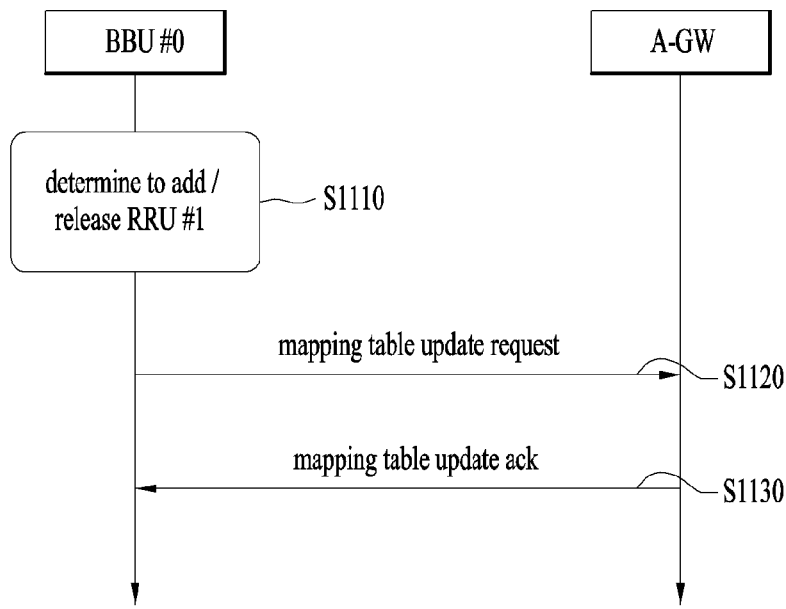
FIG. 11 is a flowchart for explaining a method of updating RRU information associated with one embodiment of the present invention.

FIG. 11 is a flowchart for explaining a method of updating RRU information associated with one embodiment of the present invention. In FIGS. 8 to 10, embodiments that an RRU connected with a BBU is switched into a different BBU have been explained. On the contrary, in FIGS. 11 to 13, embodiments that a BBU adds or releases a connection with/from an RRU are explained. In particular, if a BBU determines to provide a service to a random user equipment through a new RRU, the BBU can add a connection with the RRU. If the BBU terminates the service provided to the random user equipment, the BBU determines to release a connection with a specific RRU.

If a BBU #0 determines to add/release a connection with an RRU #1 [S1110], the BBU #0 transmits a mapping table update request message to an A-GW, a server, an entity or a unit managing a mapping relation between a BBU and an RRU [S1120]. The mapping table update request message can include at least one selected from the group consisting of a field indicating a message type, a field indicating that RRU add/release is performed among RRU add/release/switching, a field indicating an ID of an RRU corresponding to a target of the add/release, a field indicating an ID of a BBU to/from which a connection with an RRU is added/released, a field indicating an ID of a user equipment, and an IP of an A-GW or a server. The field indicating that the RRU add/release is performed among RRU add/release/switching can be configured in a manner of including an indicator indicating add or release.

Having received the mapping table update request message, the A-GW updates a mapping relation in a manner of reflecting a fact that a connection between the BBU #0 and the RRU #1 is added or released. Subsequently, the A-GW transmits a mapping table update ack message to the BBU #0 [S1130]. The mapping table update ack message can include at least one selected from the group consisting of a field indicating a message type, a field indicating that RRU add/release is performed among RRU add/release/switching, a field indicating an ID of an RRU corresponding to a target of the add/release, a field indicating an ID of a BBU to/from which a connection with an RRU is added/released, a field indicating an ID of a user equipment, and an IP of an A-GW or a server.

Having received the mapping table update ack message, the BBU #0 is able to know that the A-GW has checked a changed mapping relation between a BBU and an RRU and transmits an RRC reconfiguration message to a user equipment to inform the user equipment that a connection relation with the RRU #1 has been changed. Information received from the A-GW via the mapping table update ack message can be identically or similarly included in the RRC reconfiguration message.

Figure 12:
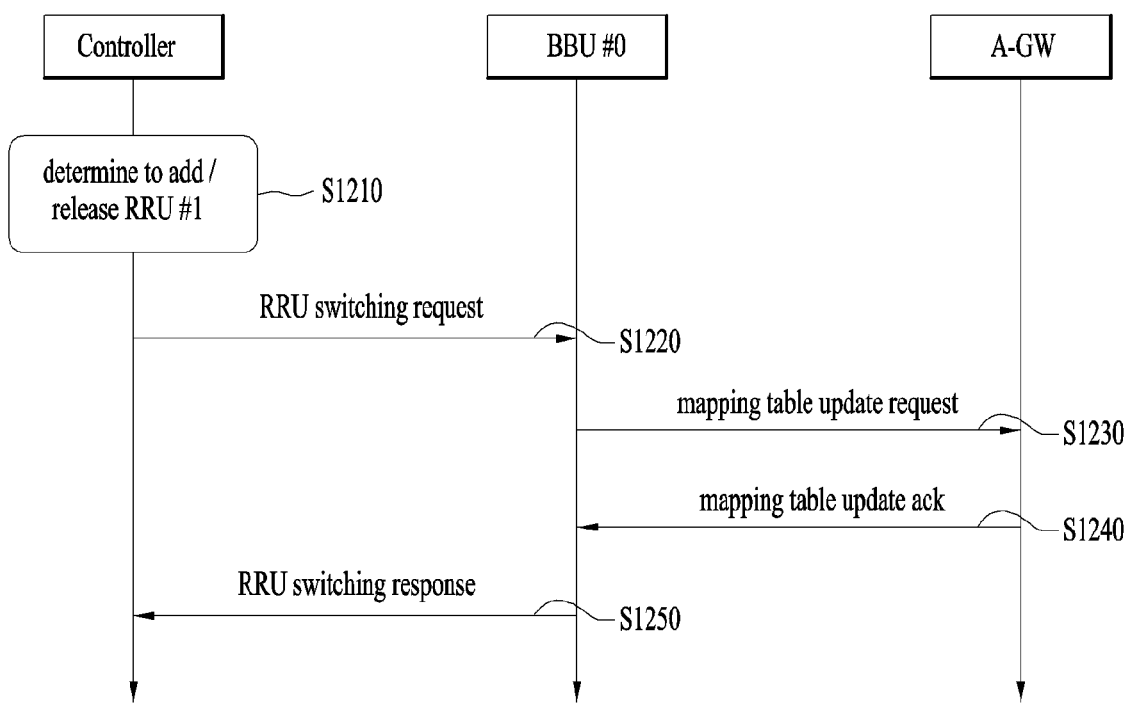
FIG. 12 is a flowchart for explaining a method of updating RRU information associated with one embodiment of the present invention.

FIG. 12 is a flowchart for explaining a method of updating RRU information associated with one embodiment of the present invention. Unlike FIG. 11, FIG. 12 explains an embodiment that a specific server, an entity or a controller (MME or RRM) except a BBU determines to add/release a connection between an RRU and a BBU. In particular, the controller can determine whether to provide or terminate a service, which is provided to a user equipment by a specific BBU via an RRU [S1210].

If the controller determines to make a BBU add/release a connection with an RRU, the controller transmits an RRU switching request message to a BBU #0 [S1220]. The RRU switching request message can be implemented in a manner of being similar to the RRU switching request message mentioned earlier in the step S910 of FIG. 9. A different point is in that a field indicating add/release can be included in the message instead of a field indicating switching among RRU add/release/switching.

Having received the RRU switching request message, the BBU #0 is able to know that the connection with the RRU has been determined to be added/released. Subsequently, the BBU #0 transmits a mapping table update request message to an A-GW [S1230] and receives a mapping table update ack message from the A-GW [S1240]. The steps S1230 and S1240 can be implemented in a manner of being similar to the steps S1120 and S1130 of FIG. 11.

Having received the mapping table update ack message, the BBU #0 transmits an RRU switching response message to the controller, which has transmitted the RRU switching request message [S1250]. And, the BBU #0 can transmit an RRC reconfiguration message to a user equipment to inform the user equipment that the connection with the RRU #1 is added/released.

Figure 13:
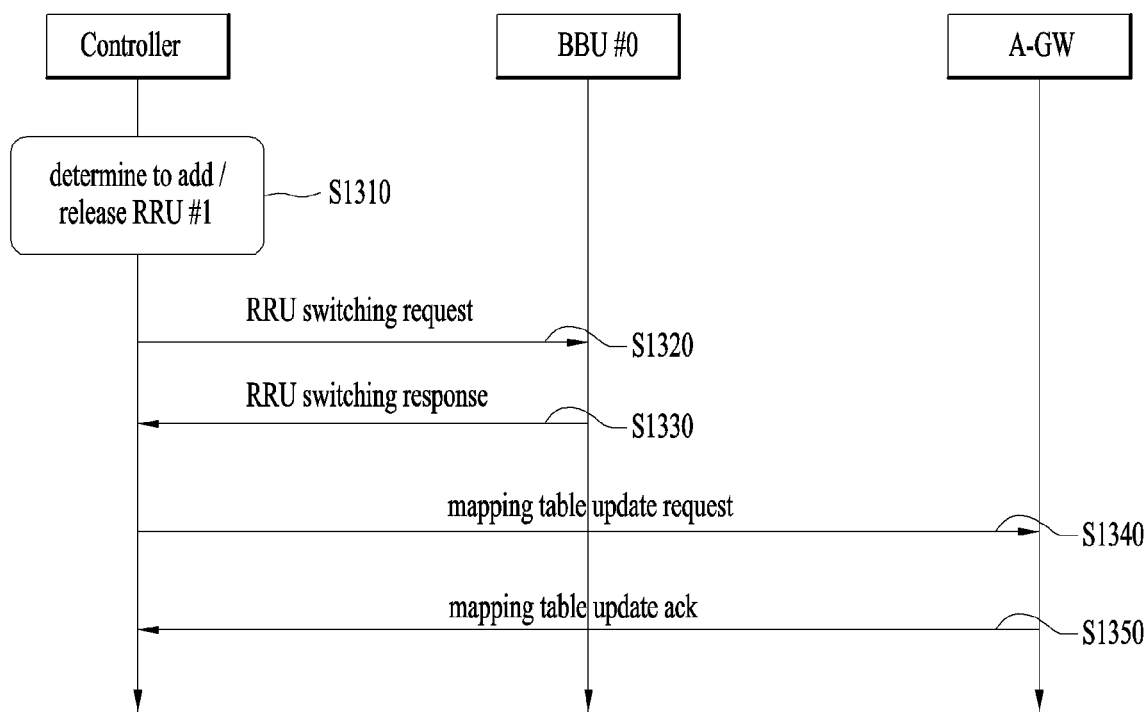
FIG. 13 is a flowchart for explaining a method of updating RRU information associated with one embodiment of the present invention.

FIG. 13 is a flowchart for explaining a method of updating RRU information associated with one embodiment of the present invention. In FIG. 13, the steps S1310, S1320 and S1330 can be implemented in a manner of being identical or similar to the steps S1210, S1220 and S1250 of FIG. 12. Meanwhile, in FIG. 13, a controller instead of a BBU #0 transmits a mapping table update request message to an A-GW [S1340] and receives a mapping table update ack message from the A-GW [S1350].

In the foregoing description, it has been explained as embodiments (FIGS. 8 to 10) of switching a connection relation of an RRU and embodiments (FIGS. 11 to 13) of adding/releasing a connection with an RRU are performed using messages including an identical or similar field. Yet, in case of switching a connection and in case of adding/releasing a connection, it may be able to define messages different from each other and transmit/receive the messages.

In FIGS. 8 to 13, embodiments that the A-GW manages a mapping relation between a BBU and an RRU have been explained. Yet, as mentioned earlier in FIG. 6, not only the A-GW but also a BBU can collect information on a mapping relation between a neighboring RRU of an RRU connected with the BBU and a BBU and manage the information. In the following, various embodiments that a BBU updates a mapping relation between a BBU and an RRU according to RRU switching/add/release are explained.

First of all, a BBU periodically monitors a BBU-RRU mapping table managed by an A-GW, a server, an entity or the like and may be able to periodically update information on a BBU-RRU mapping relation. In particular, the BBU can update information on a mapping relation managed by the BBU in a manner of periodically transmitting and receiving data with the A-GW that manages the BBU-RRU mapping relation. Or, if the BBU-RRU mapping relation changes, the A-GW managing the BBU-RRU mapping relation can transmit information on the changed mapping relation to the BBU.

Specifically, the BBU periodically transmits a mapping table change request message to the A-GW to make a request for a changed item among a BBU-RRU mapping table of RRUs adjacent to an RRU connected with the BBU. A period of transmitting the mapping table change request message can be determined by the BBU in consideration of characteristics (e.g., mobility) of user equipments supported by the BBU. The period can also be determined by the A-GW. The mapping table change request message can include at least one selected from the group consisting of a field indicating a message type, a field indicating a list of neighboring RRUs of the BBU, a field indicating an ID of the BBU, a field indicating an IP of the A-GW, a field indicating an IP of the A-GW and a field indicating an ID of a user equipment.

Having received the mapping table change request message, the A-GW extracts information on a newly changed mapping relation from the BBU-RRU mapping relation requested by the BBU and transmits the information to the BBU in a manner of including the information in a mapping table change response message. In this case, the information on the changed mapping relation can include information which is changed until a new mapping table change request message is received after the mapping table change response message is transmitted to the BBU. The mapping table change response message can include at least one selected from the group consisting of a field indicating a message type, a field indicating an ID of an RRU of which a mapping relation is changed, a field indicating an ID of a BBU connected with an RRU of which a mapping relation is changed, a field indicating an ID of a BBU receiving a message, a field indicating an IP of an A-GW, and a field indicating an ID of a user equipment. Having received the mapping table change response message, the BBU updates a changed mapping relation among the list of neighboring RRUs.

On the contrary, if a BBU-RRU mapping relation managed by the A-GW is changed, the A-GW can inform BBUs including an RRU of which a mapping relation is changed in the list of neighboring RRUs of information on the changed mapping relation. In this case, the A-GW may be able to know a list of neighboring RRUs of a BBU to which the RRU of which the mapping relation is changed belongs thereto in advance. The A-GW can inform the BBU of the changed mapping relation according to a predefined period or can inform the BBU of the changed mapping relation according to an occurrence of a change event of a mapping relation as a trigger condition.

In this case, a main entity of transmitting the aforementioned mapping table change request/response message becomes reversed. In particular, the A-GW transmits the mapping table change request message to the BBU and the BBU can transmit the mapping table change response message to the A-GW after updating a mapping relation.

Meanwhile, unlike the aforementioned embodiment, when a connection of an RRU is switched/added/released, a BBU, which has determined and performed the switching/add/release of the connection, can directly notify that a mapping relation is changed. This is because it is highly probable for RRUs adjacent to each other to mutually include each other in a list of neighboring RRUs. For example, if an RRU #0 and an RRU #1 are adjacent to each other, it is highly probable that the RRU #0 and the RRU #1 mutually include each other in a list of neighboring RRUs.

Hence, if an RRU #1 connected with a BBU #0 is switched to a BBU #1, the BBU #0 can inform BBUs to which RRUs adjacent to the RRU #1 are connected of a change of a mapping relation of the RRU #1. The BBU #0 transmits a neighbor RRU list update message to the BBUs to which the RRUs adjacent to the RRU #1 are connected. The neighbor RRU list update message can include at least one selected from the group consisting of a field indicating a message type, a field indicating that switching is performed among RRU switching/add/release, a field indicating an ID of an RRU of which a mapping relation is changed, a field indicating an ID of a BBU to which an RRU is previously connected, a field indicating an ID of a BBU to which an RRU is newly connected, and a field indicating a ID of a user equipment.

Having received the neighbor RRU list update message, the BBUs update information on the mapping relation of the RRU #1, which is included in a list of neighboring RRUs of the BBUs, from the BBU #0 to the BBU #1. Subsequently, having updated the mapping relation, the BBUs can transmit a neighbor RRU list update ack message to the BBU, which has transmitted the neighbor RRU list update message. The neighbor RRU list update ack message can include at least one selected from the group consisting of a field indicating a message type, a field indicating an ID of an RRU, a field indicating an ID of a BBU to which an RRU is previously connected, a field indicating an ID of a BBU to which an RRU is newly connected, and a field indicating a ID of a user equipment.

Lastly, it is able to newly generate a reference signal configured by an RRU according to a change of a BBU-RRU mapping relation. In particular, as mentioned earlier in the embodiment of FIG. 7, if a reference signal consists of an RRU ID and a BBU ID, an RRU of which a mapping relation is changed changes an ID of a BBU that configures the reference signal. If a mapping relation between an RRU and a BBU is added or released, the RRU configures a reference signal in a manner of adding a new BBU ID to the reference signal or may be able to stop transmitting a reference signal including a released BBU ID.

Hence, if user equipments receive a new reference signal, the user equipment can inform a serving BBU of the user equipments of a change of a mapping relation of an RRU, which has transmitted the reference signal, in a manner of transmitting a measurement report message to the serving BBU. Having received the measurement report message from the user equipment, the BBUs are able to know that the mapping relation of the RRU, which has transmitted the reference signal to the user equipment, has changed.

Although the RRU switching means switching of a bearer in the present invention, by which the present invention may be non-limited. In particular, the RRU switching can also be performed in such a unit as an IP flow, a service data flow, an EPS (evolved packet system) bearer, an EPS session unit, etc. Moreover, an indicator indicating the above-mentioned various mapping relation change units can be additionally included in the aforementioned various messages.

5. Device Configuration

Figure 14:
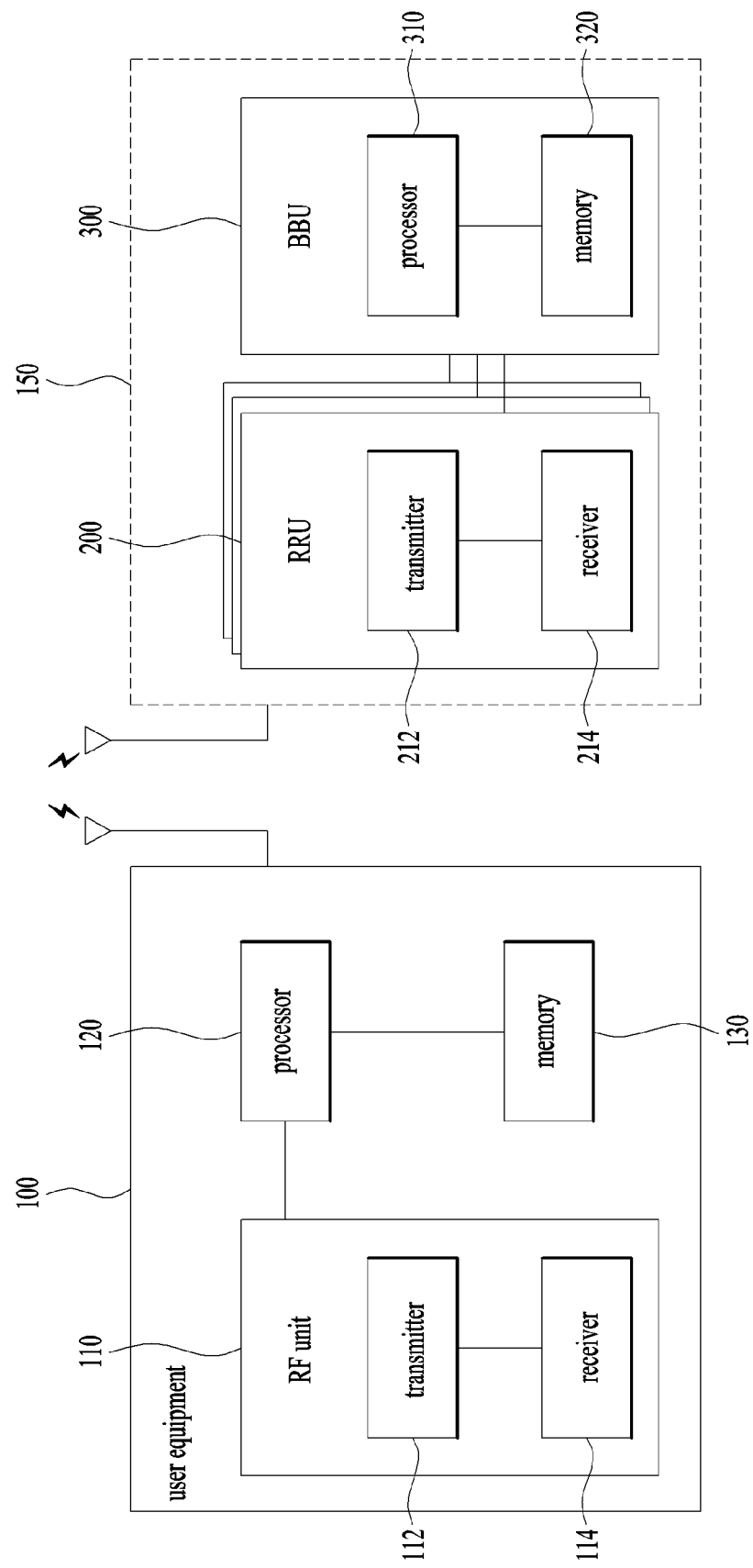
FIG. 14 is a block diagram for a configuration of a user equipment, an RRU and a BBU associated with one embodiment of the present invention.

FIG. 14 is a block diagram for a configuration of a terminal 100, an RRU 200 and a BBU 300 according to one embodiment of the present invention. Although FIG. 14 shows 1:1 communication environment between the terminal 100 and the RRU 200, communication environment can also be constructed between a plurality of terminals and the RRU.

Referring to FIG. 14, the terminal 100 can include an RF (radio frequency) unit 110, a processor 120 and a memory 130. A legacy base station 150 is configured to include a transmitting unit 212, a receiving unit 214, a processor 310 and a memory 320. On the contrary, in cloud RAN environment according to one embodiment of the present invention, the components included in the legacy base station 150 are implemented in a manner of being separated into an RRU 200 and a BBU 300.

Hence, the RRU 200 simply playing a role of an antenna includes a transmitting unit 212 and a receiving unit 214 only. Overall communication procedures such as signal processing, layer processing and the like are controlled by a processor 310 and a memory 320 included in the BBU 300. And, various connection relationships such as 1:1, 1:N, M:1, and M:N (where M and N are natural number) can be formed between the RRU 200 and the BBU 300.

The RF unit 110 included in the terminal 100 can include a transmitting unit 112 and a receiving unit 114. The transmitting unit 112 and the receiving unit 114 are configured to transceive a signal with the RRU 200. A processor 120 is functionally connected with the transmitting unit 112 and the receiving unit 114 and can be configured to control the transmitting unit 112 and the receiving unit 114 to transceive a signal with a different device. And, the processor 120 performs various processing on a signal to be transmitted and transmits the signal to the transmitting unit 112. The receiving unit 114 can perform processing on the received signal.

If necessary, the processor 120 can store information included in an exchanged message in a memory 130. With this structure, the terminal 100 can perform the aforementioned various embodiments of the present invention.

The transmitting unit 212 and the receiving unit 214 included in the RRU 200 are configured to transceive a signal with the terminal 100. The processor 310 of the BBU 300 connected with the RRU 200 is functionally connected with the transmitting unit 212 and the receiving unit 214 and can be configured to control the transmitting unit 212 and the receiving unit 214 to transceive a signal with different devices. Although it is not explicitly shown in the drawing, the BBU 300 can also include a transmitting unit and a receiving unit to transceive data with the RRU 200.

The processor 310 of the BBU 300 performs various processing on a signal to be transmitted and transmit the signal to the transmitting unit 212 of the RRU 200. The processor 310 of the BBU 300 can perform processing on a signal received by the receiving unit 214 of the RRU 200. If necessary, the processor 310 can store information included in the exchanged message in the memory 320. With this structure, the RRU 200 and the BBU 300 can perform the aforementioned various embodiments of the present invention.

The processor 120/310 of the terminal 100 and the BBU 300 indicates (e.g., controls/adjusts/manages etc.) operations of the terminal 100, the RRU 200 and the BBU 300. Each of the processors 120/310 can be connected with the memory 130/320 configured to store program codes and data. The memory 130/320 stores an operating system, an application and general files in a manner of being connected with the processor 120/310.

The processors 120/310 according to the present invention can also be called a controller, a microcontroller, a microprocessor, a microcomputer, etc. The processors 120 and 220 may be embodied in the form of hardware, firmware, software, or a combination thereof. When an embodiment of the present invention is embodied using hardware, the processor 120/310 may include application specific integrated circuits (ASICs), digital signal processors (DSPs), digital signal processing devices (DSPDs), programmable logic devices (PLDs), field programmable gate arrays (FPGAs), or the like which is configured to embody the present invention.

The embodiments of the present invention may be written as computer programs and can be implemented in general-use digital computers that execute the programs using a computer readable recording medium. In addition, a structure of data used in the above-described method may be recorded in a computer readable recording medium through various methods. Program storage devices used for description of a storage device containing an executable computer code for execution of the various methods according to the present invention is not understood as temporary objects such as carrier waves or signals. Examples of the computer readable recording medium include magnetic storage media (e.g., ROMs, floppy disks, hard disks, etc.) and optical recording media (e.g., CD-ROMs, or DVDs).

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of obtaining information regarding a remote radio unit (RRU) by a first baseband unit (BBU) in a heterogeneous cell environment in which a macro cell and a small cell coexist, the method comprising:
   receiving, by the BBU, a measurement report message from a user equipment (UE), through a serving RRU corresponding to the UE, wherein the serving RRU is connected to the first BBU, wherein the measurement report message contains information regarding a target RRU which transmits a reference signal to the UE with a strength equal to or greater than a threshold value, wherein the target RRU is connected with and physically separated from a second BBU, and the second BBU performs L1/L2/L3 layer processing for the target RRU;
   receiving information regarding the second BBU; and
   performing a coordination procedure regarding interference control with the second BBU or supporting handover of the UE from the serving RRU to the target RRU using the information regarding the second BBU, wherein a mapping relation between RRUs and BBUs is time-varying and based on at least one of load of the BBUs and an available resource status of the BBUs.

2. The method of claim 1, wherein the measurement report message comprises an RRU ID of the target RRU and information on a frequency band used by the target RRU.

3. The method of claim 1, further comprising:
   transmitting, to the UE, a system information request message for requesting second information regarding the second BBU, wherein the second information regarding the second BBU is received from the second BBU, which is connected with the target RRU through the UE in response to the system information request message.

4. The method of claim 3, further comprising: mapping the target RRU to the second BBU based on the system information request message.

5. The method of claim 3, wherein the system information request message comprises a BBU ID for the second BBU.

6. The method of claim 1, further comprising:
   transmitting an RRU information request message, for requesting third information regarding the second BBU, which is connected with the target RRU, to an access gateway (A-GW) which manages a mapping relation between RRUs and BBUs; and receiving an RRU information response message from the A-GW containing identification information regarding the second BBU in response to the RRU information request message.

7. The method of claim 6, further comprising:
mapping the second BBU to the target RRU based on the identification information of the second BBU.

8. The method of claim 1, wherein the measurement report message further comprises the information regarding the second BBU.

9. The method of claim 8, wherein the reference signal comprises a bitmap connecting an RRU ID of the target RRU and a BBU ID of the second BBU or an ID interleaving the RRU ID and the BBU ID.

10. The method of claim 1, wherein when the BBU supports handover of the UE from the serving RRU to the target RRU, the BBU and the second BBU are included in different BBU pools from each other.

11. A baseband unit (BBU) obtaining information regarding a remote radio unit (RRU) in a heterogeneous cell environment in which a macro cell and a small cell coexist, the BBU comprising:
a transmitter,
a receiver, and
a processor, coupled to the transmitter and receiver, which controls a serving RRU, wherein the processor further:
controls the receiver to receive a measurement report message, from a user equipment (UE) through the serving RRU corresponding to the UE, wherein the serving RRU is connected to the BBU, wherein the measurement report message contains information regarding a target RRU transmitting a reference signal to the UE with a strength equal to or greater than a threshold value, and wherein the target RRU is connected with and physically separated from a second BBU, and the second BBU performs L1/L2/L3 layer processing for the target RRU, and
controls the receiver to receive information the second BBU,
performs a coordination procedure regarding interference control with the second BBU or supports handover of the UE from the serving RRU to the target RRU using the information the second BBU, and wherein a mapping relation between RRUs and BBUs is time-varying and based on at least one of load of the BBUs and an available resource status of the BBUs.

12. The BBU of claim 11, wherein the measurement report message comprises an RRU ID of the target RRU and information on a frequency band used by the target RRU.

13. The BBU of claim 11, wherein the processor further controls the transmitter to transmit, to the UE, a system information request message for requesting second information regarding the second BBU, and
wherein the second information regarding the second BBU is received from the second BBU connected with the target RRU and through the UE in response to the system information request message.

14. The BBU of claim 13, wherein the processor maps the target RRU to the second BBU based on the system information request message.

15. The BBU of claim 13, wherein the system information request message comprises a BBU ID of the another BBU.

16. The BBU of claim 11, wherein the processor further controls the transmitter to transmit an RRU information request message, for requesting third information regarding the second BBU, which is connected with the target RRU, to an access gateway (A-GW) which manages a mapping relation between RRUs and BBUs, and
wherein the processor further controls the receiver to receive an RRU information response message from the A-GW containing identification information regarding the second BBU in response to the RRU information request message.

17. The BBU of claim 16, wherein the processor maps the second BBU to the target RRU based on the identification information of the second BBU.

18. The BBU of claim 11, wherein the measurement report message further comprises the information on the second BBU.

19. The BBU of claim 18, wherein the reference signal comprises a bitmap connecting an RRU ID of the target RRU and a BBU ID of the second BBU or an ID interleaving the RRU ID and the BBU ID.

20. The BBU of claim 11, wherein when the BBU supports handover of the UE from the serving RRU to the target RRU, the BBU and the second BBU are included in different BBU pools from each other.

* * * * *